Feb. 8, 1966   M. A. TURTURRO ET AL   3,233,768
HOUSE LOADING TRAILER
Filed Feb. 9, 1962   2 Sheets-Sheet 1
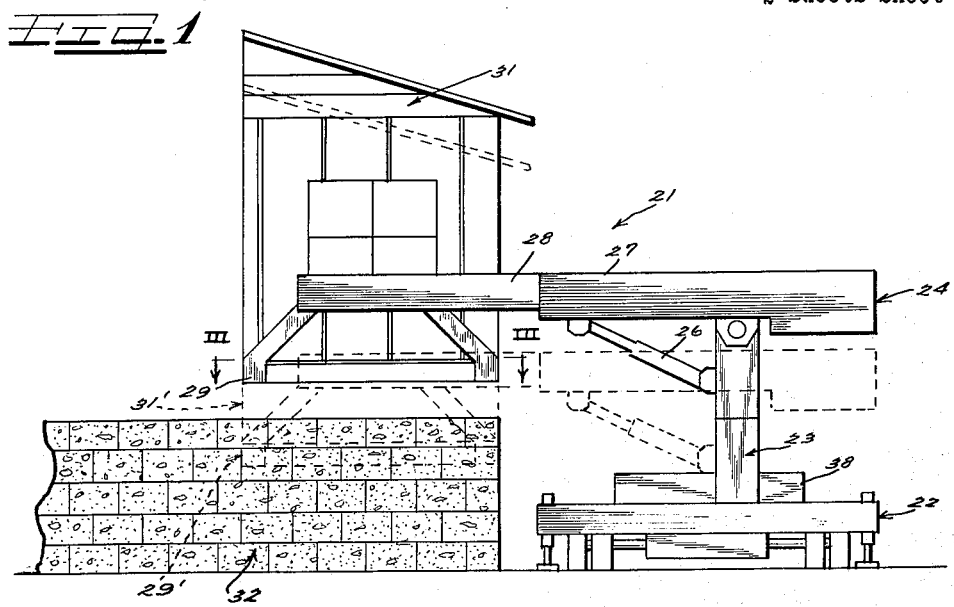
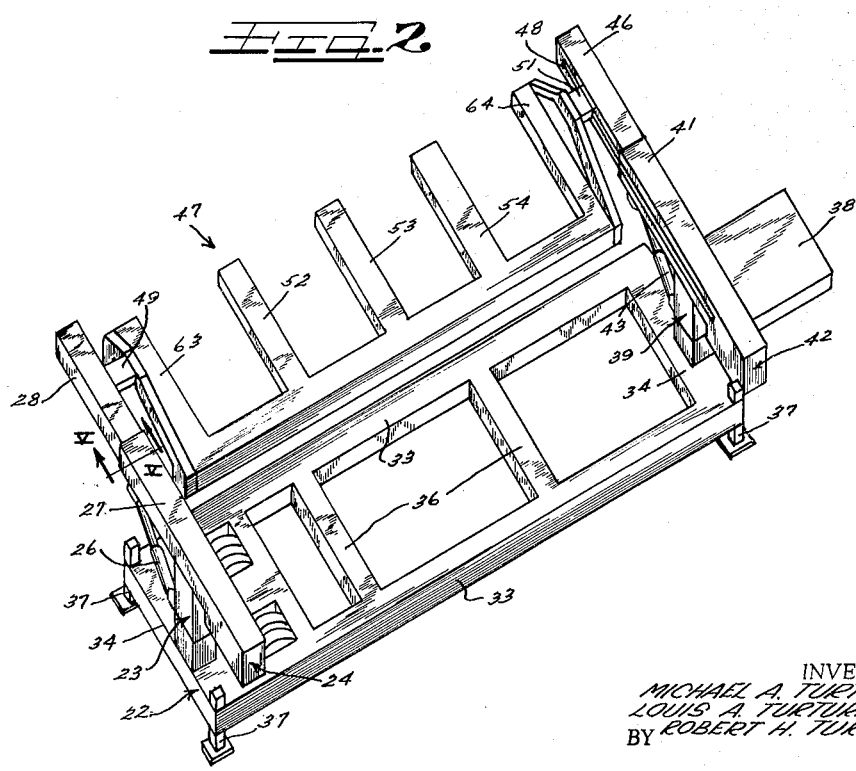
INVENTORS
MICHAEL A. TURTURRO
LOUIS A. TURTURRO JR.
BY ROBERT H. TURTURRO
ATTORNEYS Feb. 8, 1966  M. A. TURTURRO ETAL  3,233,768
HOUSE LOADING TRAILER
Filed Feb. 9, 1962  2 Sheets-Sheet 2
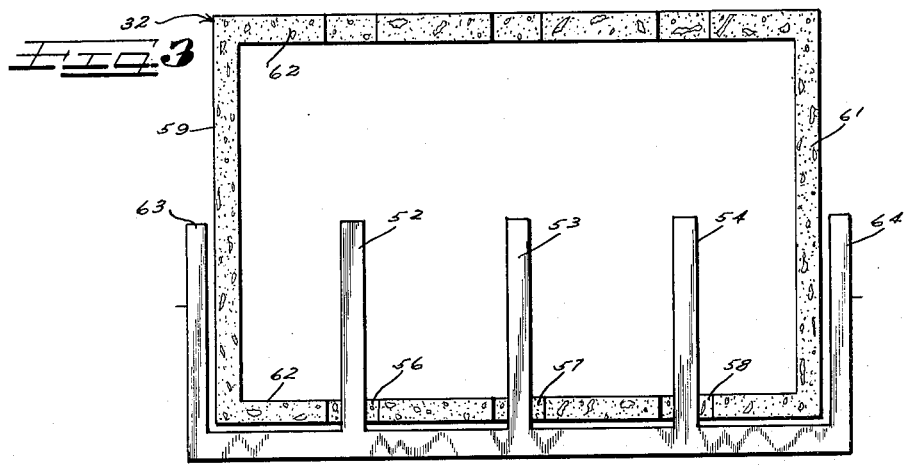
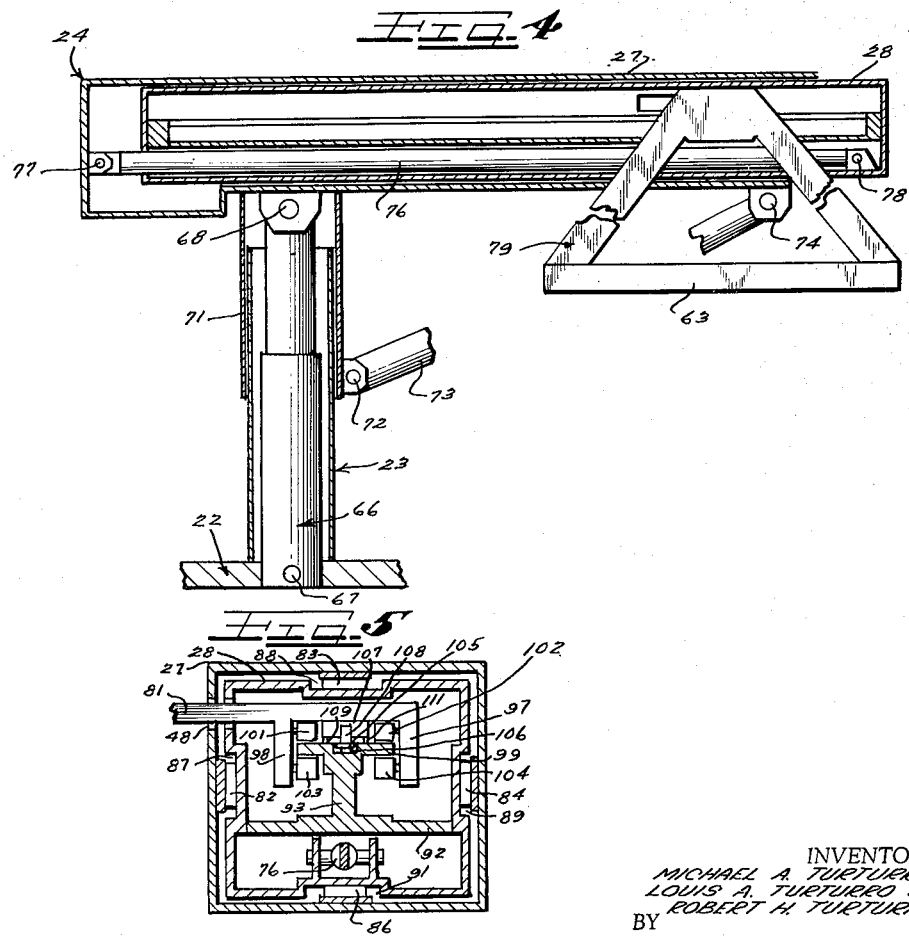
INVENTORS
MICHAEL A. TURTURRO
LOUIS A. TURTURRO JR.
ROBERT H. TURTURRO
BY
Hill, Sherman, Meroni, Gross & Simpson
ATTORNEYS United States Patent Office 3,233,768
Patented Feb. 8, 1966

1

3,233,768
HOUSE LOADING TRAILER
Michael A. Turturro, Louis A. Turturro, Jr., and Robert H. Turturro, all of 30 Kendall St., Worcester, Mass.
Filed Feb. 9, 1962, Ser. No. 172,250
5 Claims. (Cl. 214—730)

This application is a continuation-in-part of our copending application S.N. 136,690 filed on August 29, 1961.

This invention generally relates to a means and method for moving large articles and is more particularly directed to an improved trailer means and loading and unloading methods for moving the large articles.

Heretofore, large articles such as preconstructed house units, have been loaded by a separate means onto a trailer bed delivered to the unloading site, and unloaded by another means onto an erection foundation. The preconstructed house units on reaching the foundation were in need of expensive repairs. The known loading and unloading methods weakened the structure of the preconstructed house units by tilting the house units, which puts extreme stress and pressure on the supports of the preconstructed house units; dragged the unit from a loading platform to the trailer bed and dragged from the trailer bed onto the house foundation weakening the preconstructed unit structure; and the preconstructed house unit was unable to contain all materials and appliances necessary for having a completed house when they were combined on the erected house foundation. Joggling, jouncing, dragging and tilting the preconstructed house units during their loading and unloading also damaged the appliances that were installed in the preconstructed house unit before its being moved and cracked inside walls.

These difficulties encountered by the use of known loading and unloading and transporting apparatus has prevented the house contractor from building and erecting houses with preconstructed house units. The building contractor now erects houses with precut materials that are assembled at the erection site. The assembling of materials at the erection site is costly and time consuming and dependent upon weather conditions and the labor market. By the use of preconstructed house units a complete house may be assembled in a matter of days. The unit is assembled in an indoor factory, providing work all year around for skilled laborers. Work is done more economically and the house may be built to individual specifications with little extra cost.

The present invention substantially eliminates all these problems encountered by prior loading, transporting and unloading equipment used in the erection of preconstructed house units into a completed house by loading, transporting and unloading the preconstructed house units with friction-free movement thereof.

It is therefore an object of the present invention to provide an improved apparatus to load, transport, and unload preconstructed house units.

It is another object of the present invention to provide a means that loads, transports, and unloads preconstructed house units on a house foundation by self contained loading, transporting, and unloading apparatus.

It is further an object of this invention to provide a trailer apparatus that loads, transports, and unloads preconstructed house units with friction-free movement of the units.

It is further another object of this invention to provide a trailer bed that has extending stabilizers attached thereto.

It is still another object of this invention to provide a trailer apparatus and method that loads, unloads and transports preconstructed house units and maintains the preconstructed house units on a substantially horizontal plane.

It is further an object of this invention to provide a trailer apparatus that vertically lifts and lowers as well as laterally moves a preconstructed house unit.

It is still another object of this invention to provide a trailer with a rack to support a preconstructed house unit, said rack being capable of moving up and downwards as well as laterally and maintaining preconstructed house unit on a substantially horizontal plane, and said rack means moved laterally by a track means attached thereto.

These and other objects, features of the present invention will become apparent from a careful consideration of the following detailed description when considered in conjunction with the accompanying drawing illustrating preferred embodiments of the present invention and wherein like reference numerals and characters referred to corresponding parts throughout the several views.

On the drawings:

FIGURE 1 is a general rear view of a trailer of the present invention unloading a preconstructed house unit onto a house foundation;

FIGURE 2 is an isometric view of the trailer in the position shown in FIGURE 1;

FIGURE 3 is a top view taken along line III—III of FIGURE 1;

FIGURE 4 is a transverse cross-sectional view of the lifting and lateral moving means of FIGURE 2;

FIGURE 5 is a longitudinal cross-sectional view taken along lines V—V of FIGURE 2.

As shown on the drawings:

The present invention advantageously utilizes the ability of a trailer to move articles over the highways. The trailer of the instant invention is maneuvered alongside a loading platform where it loads a preconstructed house unit onto itself. The trailer loads the preconstructed house unit by raising a finger rack and laterally moving the finger rack under the preconstructed house unit. When the rack is in position under the house unit the rack is actuated upwards and the house unit is lifted off its loading platform. The house unit is then laterally moved over the trailer bed where the lifting device is lowered into a closed or compact position. The stabilizing arms on the trailer are retracted into the trailer bed or collapsed on the trailer bed and levelizing jacks mounted on the corners of the trailer bed are raised. Throughout the entire operation the trailer has maintained the house unit on a substantially horizontal plane and the house unit was not subjected to frictional movement.

The trailer, which is mounted onto a truck cab, is delivered to an erection site. A house foundation, having accommodating slots or receiving recesses for the trailer rack, has been built at the erection site. The trailer moves alongside the house foundation into unloading position. The levelizing jacks are lowered. The stabilizing arms are extended and placed in position on the sides of the house foundation. The house unit is then raised off the trailer bed and laterally moved over the house foundation. The trailer rack with the house unit thereon is lowered and the slots in the house foundation accommodate the rack support finger arms.

The preconstructed house unit is supported on the house foundation. The rack finger arms are then slid through the slots and out from beneath the preconstructed house unit.

The loading-unloading means is retracted onto the trailer bed, the levelizing jacks raised, the stabilizing arms retracted, and the trailer returned to the factory to pick up another preconstructed house unit. A second similar trailer is delivering another preconstructed house unit to be unitized with the already delivered preconstructed house unit.

The preconstructed house units are built at an indoor factory. They are built, as regards to their size and weight, according to highway regulations for transporting such units over the highways. The units have contained within them all necessary plumbing, electrical wiring, plastering, painting, wall papering, fixtures, appliances and any furniture a house buyer decides to be placed within the house such as couches, rugs, tables etc. Preconstructed house units are designed in accordance to the completed house desired by the buyer.

FIGURE 1 shows the rear view of the mobile trailer 21 having a trailer bed 22 having a boom lift 23. The boom lift 23 has mounted thereon an extendable track arm 24 and a supporting arm 26 mounted to the track arm 24 and the lift 23 which maintains the arm 24 on a horizontal plane. The track arm consists of a primary portion 27 and a retractable portion 28. Mounted on the track arm is a rack 29 to support the preconstructed house unit 31 during loading, transporting and unloading. FIGURE 1 shows the preconstructed house unit over the foundation 32 in position to be lowered onto the foundation as shown by 31' and the rack to be disengaged from the bottom of the house unit at 29'.

As is shown in FIGURES 2–5 the trailer has the trailer bed 22 which has side frames 33 and end members 34 with cross support members 36. Mounted on the four corners of the trailer bed are levelizing jacks 37 which are used to stabilize and levelize the trailer during its loading and unloading operation. The trailer has a goose neck 38 which connects the trailer to a truck chassis for transportation to desired locations.

The trailer bed has a length greater than the length of the house foundation 32. On its far end there is attached the lift 23, and attached adjacent the goose neck 38 a lift 39. On top of the respective lifts 23 and 39 are track extending arms 24 and 42. The lift 23 has mounted at its top the primary section 27 of the track extendable means 24, and the lift 39 has mounted on its top the primary section 41 of track extendable means 42. The track extendable arms 24 and 42 are maintained on a horizontal plane by the support arms 26 and 43 connected thereto.

The extendable track arms have retractible-extendable arms 28 and 46 that transversely move a preconstructed house rack 47 over a house foundation. The primary sections 27 and 41 and the extendable sections 28 and 46 of their respective track arms 24 and 42 have slots 48 on their inner sides. The slots accommodate rack guide drive support means 49 and 51 which are attached to the rack 47. The rack has finger support members 52, 53 and 54 that are accommodated by slots 56, 57 and 58 in the foundation. When the preconstructed house is lowered onto the house foundation 32, it is supported by sides 59 and 61 and face 62 of the house foundation 32. When the house is supported by the foundation, the rack is lowered so as to disengage the fingers 52, 53 and 54 from the bottom of the preconstructed house unit. The fingers are slid from beneath the house unit through the slots 56, 57 and 58. The rack has ends 63 and 64 which are adjacent to the outer surface of the sides 59 and 61 of the house foundation.

The track arm 24 as best illustrated by FIGURE 4, is raised by the lift 23. The lift 23 has a hydraulic cylinder 66 therein connected to the trailer bed 22 by pin 67 and connected to the track arm 24 by pin 68. The lift has coacting extendable frames 69 and 71. Thus, the hydraulic cylinder 66 raises and lowers the track arm 24. The frame 71 by a pin 72 attaches a hydraulic support arm 73 thereto. The hydraulic support arm is attached at its other end to the track arm 24 by a pin 74. The track arm 24 has a primary section 27 and a retractible arm section 28 that is retracted and extended by hydraulic cylinder 76. The cylinder 76 is connected to the back end of the primary extension arm 27 at 77 and the front end of the extension arm 28 at 78. The extendable track arm 24 accommodates a rack support member 79 which has a trapezoidal shape.

The rack support member 79 as shown by FIGURE 5, has an arm 81 that connects the rack 47 to the track arm 24. The track arm has roller means 82, 83, 84 and 86 placed between the section 27 and the section 28 to ease movement therebetween. The sections 27 and 28 are of a hollow construction. The section 28 has recesses 87, 88, 89 and 91 to accommodate said rollers.

The section 28 has a cross support 92 extending the inner length thereof. On the cross support 92 is a T-rail 93 that is used to transversely move the rack and preconstructed house unit. The rack support 79 is connected by the arm 81 through the slots 48 to the T-rail 93.

The arm 81 has connected thereto side frames 97 and 98 which are wider than a T-support 99 of the T-rail 93. The side rails 98 and 97 have mounted thereon rolls 101 and 102 engaging the top surface of the T-support 99 and rolls 103 and 104 for engaging the bottom surface of the T-support 99. The T-support has a central recess 106, extending the length thereof, that supports a track 105. On the inner surface of the arm 81 and between the side frames 98 and 97 is fixedly secured a pinion gear motor 107 with pinion gear 108.

The bottom of the motor 107 has attached thereto roller means 109 and 111 to ease the movement in the turning of the pinion gear 108 that engages the track 105 along the T-support 99. The track arm 42 and lift 39 are of the same construction just described with relation to track arm 24 and lift 23. The gear motor 107 is utilized to move the rack laterally. The gear motors, lifts, and track arms are all synchronized for operation of the trailer.

The trailer just shown operates by pulling along side the preconstructed house foundation 32, lowering the stabilizing jacks 37, extending stabilizing arms hereinafter described, raising the rack 47 above the level of the house foundation 32 by the lifts 23 and 39, and extending the extendable rack arms 28 and 46 to laterally move the rack 47. The motors 107 are then energized and the rack 47 moved in position over the house foundation 32. The lifts 23 and 39 are lowered until the house rests on the foundation 32. The rack is then lowered to disengage its finger arms from the house. The motor 107 slides the finger arms from beneath the house through the accommodating slots in the foundation. The arms 28 and 46 are then retracted into the arms 27 and 41, and the rack is lowered onto the trailer bed 22. The stabilizing-levelizing jacks are raised and the stabilizing arms retracted. The trailer truck having moved a house unit without any friction and maintained it on a substantially horizontal plane and thereby maintaining the unit in an upright unstressed condition, is now ready to pickup another preconstructed house unit from the factory.

It is understood that although the racks for the preconstructed house units have been shown as being finger racks, these racks may also be an E-shaped rack where the three fingers 52, 53 and 54 are a unified solid or of a hollow construction. The accommodating slot in the house foundation 32 will have to be of a wide construction to accommodate this one wide support finger.

The construction of the trailer and most of the parts therein are shown as being of hollow construction. This type of construction is used to minimize the weight and conserve the strength of the trailer in its operation.

It is further understood that the above trailers may be modified by utilizing extendable fingers on the house rack means in order to facilitate the lateral movement of the preconstructed house unit.

As it is seen with our invention we provide a house contractor with the ability to erect houses, of any design, both economically and rapidly. Our trailers are able to carry preconstructed house units which are manufactured indoors at a factory site. The preconstructed house units are self-loaded by the trailers and the trailers maintain the preconstructed house unit on a horizontal plane in an upright unstressed condition and avoid the use of any unnecessary joggling or dragging of the preconstructed house unit. The preconstructed house unit is delivered to the erection site intact and without any need of repairs because it is always completely supported, never tilted, always in an upright upstressed condition on a substantially horizontal plane, and never dragged along a frictional surface.

Although various minor modifications might be suggested by those versed in the art, it should be understood that we wish to embody within the scope of the patent warranted hereon, all such embodiments as reasonably and properly come within the scope of my contribution to the art.

We claim as our invention:

1. A house trailer for transporting, and unloading house units comprising:
    a trailer bed having two sides and two ends,
    lift means mounted on each end of said trailer bed extending perpendicularly upwards from the surface of said trailer bed,
    a track arm assembly having
        a primary track arm mounted on the upper end of each vertical means extending parallel to each other,
        an extendable secondary track arm mounted to each primary track arm,
        means to extend said secondary extendable arm so that they are parallel to each other and extend outwardly from the primary arm and beyond one side of the trailer bed,
    support means to support said house unit,
    said support means extending between said lift means and connected to each lift means,
    means mounting the support means to track arm assembly,
    means to guidingly move the support means along said secondary track arms
whereby the house unit is supported by the support means and is raised off the trailer bed and moved across one side of the trailer bed, guided by the extension tracks, over a house foundation positioned adjacent the one side of the trailer bed.

2. A trailer for transporting and placing prefabricated house units on their foundations comprising:
    a wheel mounted trailer bed having a hitch at the forward end thereof for connection with a tractor and having a pair of sides,
    lifts at the front and rear ends of the trailer bed extending vertically therefrom,
    parallel generally horizontally extending track arm assemblies attached to said lifts,
    said guide track arm assemblies having
        primary arms mounted on said lifts and having inner walls facing each other,
        secondary arms telescopically connected within said primary arms and extensibly connected thereto to extend generally parallel and horizontally beyond one side of the trailer bed and over a house foundation,
    power means connected to said primary and secondary arms to extend said secondary arms,
    guide tracks mounted within said secondary arms, and
    generally horizontally extending slots formed in the walls of said primary arms,
    a house unit support mounted to and extending between said lifts for carrying a house unit above said trailer bed,
    drive means mounted on the ends of said house unit support for moving said support through said slots and movably connected to said secondary arms, and
    power means operatively connected to the drive support means for moving said support along said secondary arms.

3. A trailer for transporting and placing prefabricated house units on their foundations comprising:
    a wheel mounted trailer bed having a hitch at the forward end thereof for connection with a tractor and having a pair of sides,
    lifts at the front and rear ends of the trailer bed extending vertically therefrom,
    parallel generally horizontally extending track arm assemblies attached to the tops of said lifts,
    said guide track arm assemblies having
        primary arms mounted on the top of said lifts and having inner walls facing each other,
        secondary arms having inner walls and being telescopically connected within said primary arms and extensibly connected thereto to extend generally parallel and horizontally beyond one side of the trailer bed and over a house foundation,
        fluid motors connected to said primary and secondary arms to extend said secondary arms,
        guide tracks mounted within said secondary arms, and
        generally horizontally extending slots formed in the inner walls of said primary and secondary arms,
    a house unit rack extending between said lifts for carrying a house unit above said trailer bed,
    drive support means extending from the ends of said rack and through said slots and movably connected to said guide tracks, and
    power means operatively connected to the drive support means for moving said rack along said guide tracks.

4. A trailer according to claim 1 wherein the secondary arms are telescopically connected within said primary arms and extensibly connected thereto.

5. A trailer for transporting and placing prefabricated house units on their foundations comprising:
    a wheel mounted trailer bed having a hitch at the forward end thereof for connection with a tractor and lift means mounted on the front and rear ends of the trailer bed and extending vertically therefrom,
    a track arm assembly having
        a primary arm mounted on each lift means and extending parallel to each other, an extendable secondary track arm mounted to each primary track arm,
    means to extend said secondary track arms so that they are parallel to each other and extend outwardly from the primary arms and beyond one side of the trailer bed,
    support means to support said house unit,
    said support means extending between said lift means and connected to each lift means,
    means mounting the support means to each track arm assembly,
    means to guidingly move the support means along said secondary track arms
whereby the house unit is supported by the support means and is raised off the trailer bed and moved across one side of the trailer bed, guided by the extension tracks, over a house foundation positioned adjacent the one side of the trailer bed.

References Cited by the Examiner
UNITED STATES PATENTS

| | | | |
|---|---|---|---|
| 1,440,400 | 1/1923 | Manierre | 212—55 X |
| 2,306,284 | 12/1942 | Shonnard | 214—512 |
| 2,412,158 | 12/1946 | Kuehlman | 214—512 |
| 2,547,269 | 4/1951 | Kinsey | 214—75 X |
| 2,773,614 | 12/1956 | Edwards et al. | |
| 2,812,077 | 11/1957 | Proctor. | |
| 2,852,931 | 9/1958 | Bonet | 50—534 |
| 2,897,985 | 8/1959 | Carlson et al. | 214—75 |
| 2,928,560 | 3/1960 | Wilkin. | |
| 2,933,210 | 4/1960 | Dye. | |
| 2,969,157 | 1/1961 | Panes. | |
| 2,996,206 | 8/1961 | McKee | 214—670 |
| 3,011,652 | 12/1961 | Falk et al. | |
| 3,053,015 | 9/1962 | Graham | 50—534 |
| 3,119,506 | 1/1964 | Bridge et al. | 214—670 |

FOREIGN PATENTS

| | | |
|---|---|---|
| 828,530 | 1/1952 | Germany. |
| 714,071 | 8/1954 | Great Britain. |
| 839,168 | 6/1960 | Great Britain. |

GERALD M. FORLENZA, *Primary Examiner.*

MORRIS TEMIN, HUGO O. SCHULZ, *Examiners.*